(12) United States Patent
Thiel et al.

(10) Patent No.: US 10,125,943 B2
(45) Date of Patent: Nov. 13, 2018

(54) MOTOR VEHICLE AND MOTOR VEHICLE HEADLAMP WITH A FRONT HOUSING

(71) Applicant: Volkswagen Aktiengesellschaft, Wolfsburg (DE)

(72) Inventors: Alexander Thiel, Braunschweig (DE); Eduard Dordel, Calberlah (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 101 days.

(21) Appl. No.: 15/262,225

(22) Filed: Sep. 12, 2016

(65) Prior Publication Data

US 2016/0377254 A1 Dec. 29, 2016

Related U.S. Application Data

(63) Continuation of application No. PCT/EP2015/055009, filed on Mar. 11, 2015.

(30) Foreign Application Priority Data

Mar. 12, 2014 (DE) .................. 10 2014 204 515

(51) Int. Cl.
*B60Q 1/04* (2006.01)
*F21S 8/10* (2006.01)
(Continued)

(52) U.S. Cl.
CPC ............ *F21S 45/47* (2018.01); *B60Q 1/0035* (2013.01); *B60Q 1/0041* (2013.01);
(Continued)

(58) Field of Classification Search
CPC .......... F21S 41/00; F21S 41/24; F21S 43/251; F21S 43/237; B60Q 1/18; B60Q 1/0035; B60Q 1/0055; B62D 25/285
See application file for complete search history.

(56) References Cited

U.S. PATENT DOCUMENTS

| 4,680,678 A | 7/1987 | Iwaki |
| 5,125,714 A | 6/1992 | Lecher |

(Continued)

FOREIGN PATENT DOCUMENTS

| CN | 100593485 C | 3/2010 |
| CN | 202156349 U | 3/2012 |

(Continued)

*Primary Examiner* — Karabi Guharay
(74) *Attorney, Agent, or Firm* — Muncy, Geissler, Olds & Lowe, P.C.

(57) ABSTRACT

A motor vehicle headlamp including a housing in which at least one main light source is arranged, at least one further light-emitter, a heat sink for cooling the light-emitter, an at least partially transparent external lens that closes off the housing from the external environment of the motor vehicle headlamp and has an inner side facing the interior of the housing and an outer side facing the external environment, a front housing that is arranged in front of the outer side of the external lens. A light-guiding element is arranged in or on the front housing that at least partially fills the interior of the front housing or forms at least part of a wall of the front housing and guides light radiated inwards by the light-emitter. A motor vehicle is provided that includes a motor vehicle headlamp and a cooling grille having at least one cooling grille lamination.

23 Claims, 12 Drawing Sheets

(51) Int. Cl.
*F21S 45/47* (2018.01)
*F21S 45/50* (2018.01)
*F21S 41/24* (2018.01)
*F21S 43/237* (2018.01)
*F21S 43/245* (2018.01)
*F21S 41/20* (2018.01)
*F21S 43/40* (2018.01)
*F21S 45/10* (2018.01)
*F21S 43/251* (2018.01)
*F21S 43/31* (2018.01)
*F21S 41/32* (2018.01)
*F21S 41/50* (2018.01)
*B60Q 1/00* (2006.01)
*B60Q 1/18* (2006.01)
*B62D 25/08* (2006.01)
*F21S 41/29* (2018.01)

(52) U.S. Cl.
CPC ............ *B60Q 1/0047* (2013.01); *B60Q 1/18* (2013.01); *B62D 25/085* (2013.01); *F21S 41/24* (2018.01); *F21S 41/28* (2018.01); *F21S 41/32* (2018.01); *F21S 41/50* (2018.01); *F21S 43/237* (2018.01); *F21S 43/245* (2018.01); *F21S 43/251* (2018.01); *F21S 43/315* (2018.01); *F21S 43/40* (2018.01); *F21S 45/10* (2018.01); *F21S 45/50* (2018.01); *B60Q 2400/30* (2013.01); *F21S 41/29* (2018.01)

(56) References Cited

U.S. PATENT DOCUMENTS

| | | | |
|---|---|---|---|
| 7,182,398 B2 | 2/2007 | Lin | |
| 7,281,823 B2 | 10/2007 | Moisel | |
| 7,401,956 B2 | 7/2008 | Larson et al. | |
| 7,641,371 B2 | 1/2010 | Effner et al. | |
| 8,408,768 B2 | 4/2013 | Schneider et al. | |
| 9,506,619 B2 | 11/2016 | Buisson | |
| 9,791,614 B2 * | 10/2017 | Nishihata | G02B 6/0038 |
| 2002/0012251 A1 | 1/2002 | Lee | |
| 2004/0130904 A1* | 7/2004 | Yamada | B60Q 1/0058 362/487 |
| 2008/0180970 A1 | 7/2008 | Mertens | |
| 2009/0175047 A1 | 7/2009 | Tsai | |
| 2012/0069592 A1 | 3/2012 | Natsume et al. | |
| 2012/0113679 A1* | 5/2012 | Boonekamp | G02B 6/0063 362/607 |
| 2013/0051050 A1* | 2/2013 | Yang | B60Q 1/0052 362/516 |
| 2013/0182450 A1 | 7/2013 | Buisson | |
| 2013/0314935 A1 | 11/2013 | Tokieda et al. | |
| 2013/0343074 A1 | 12/2013 | Tsukamoto | |

FOREIGN PATENT DOCUMENTS

| | | |
|---|---|---|
| CN | 102997153 A | 3/2013 |
| CN | 103153702 A | 6/2013 |
| DE | 39 28 327 C1 | 11/1990 |
| DE | 199 33 713 A1 | 1/2001 |
| DE | 199 43 255 A1 | 3/2001 |
| DE | 100 36 323 A1 | 2/2002 |
| DE | 102 08 140 A1 | 9/2003 |
| DE | 103 37 617 A | 3/2005 |
| DE | 103 40 723 A1 | 4/2005 |
| DE | 103 32 977 A1 | 7/2005 |
| DE | 10 2004 039 004 A1 | 2/2006 |
| DE | 10 2004 013 755 B4 | 3/2006 |
| DE | 10 2006 007 134 A1 | 8/2007 |
| DE | 10 2006 014 226 A1 | 10/2007 |
| DE | 10 2006 017 780 A1 | 10/2007 |
| DE | 10 2006 059 904 A1 | 6/2008 |
| DE | 10 2007 005 551 A1 | 7/2008 |
| DE | 10 2007 018 678 A1 | 10/2008 |
| DE | 20 2008 009 015 U1 | 10/2008 |
| DE | 10 2008 003 915 A1 | 7/2009 |
| DE | 10 2008 059 322 A1 | 6/2010 |
| DE | 10 2009 034 954 A1 | 2/2011 |
| DE | 10 2009 039 038 A1 | 3/2011 |
| DE | 10 2010 006 974 A1 | 8/2011 |
| DE | 20 2011 100 750 U1 | 8/2011 |
| DE | 10 2011 119 379 A1 | 5/2013 |
| EP | 1 391 348 A2 | 2/2004 |
| EP | 1 459 934 A2 | 9/2004 |
| EP | 1 835 224 A1 | 9/2007 |
| EP | 2 071 228 A2 | 6/2009 |
| EP | 2 338 732 A1 | 6/2011 |
| EP | 2 481 978 A1 | 8/2012 |
| EP | 2 568 320 A2 | 3/2013 |
| FR | 2 831 647 A1 | 5/2003 |
| FR | 2 917 348 A1 | 12/2008 |
| FR | 2 979 414 A1 | 3/2013 |
| JP | H 07-45102 A | 2/1995 |
| JP | H 07-201209 A | 8/1995 |
| JP | 2011-129250 A1 | 6/2011 |
| JP | 2011-198536 A | 10/2011 |
| JP | 2012-199155 A | 10/2012 |
| WO | WO 2006/018067 A1 | 2/2006 |
| WO | WO 2013/075792 A2 | 5/2013 |

\* cited by examiner

MOTOR VEHICLE AND MOTOR VEHICLE HEADLAMP WITH A FRONT HOUSING

This nonprovisional application is a continuation of International Application No. PCT/EP2015/055009, which was filed on Mar. 11, 2015, and which claims priority to German Patent Application No. 10 2014 204 515.0, which was filed in Germany on Mar. 12, 2014, and which are both herein incorporated by reference.

BACKGROUND OF THE INVENTION

Field of the Invention

The invention relates to a motor vehicle headlamp that comprises a housing in which is arranged at least one main light source, and that has at least one additional lamp as well as a heat sink for cooling the at least one lamp. The motor vehicle headlamp also comprises an at least partially transparent external lens that seals the housing with respect to the outside environment of the motor vehicle headlamp, and an inner side facing the interior of the housing, and an outer side facing the outside environment, as well as a front housing that is arranged in front of the outer side of the external lens. The invention also relates to a motor vehicle with a motor vehicle headlamp according to the invention.

Description of the Background Art

From EP 1 835 224 A1, a motor vehicle lamp is known that has multiple main light sources arranged in a housing and also has multiple reflecting elements. The housing is sealed by an external lens, which is also referred to as a cover lens or as a cover plate. A light-guiding element is arranged inside the housing between the main light sources and the external lens.

From US 2012/0069592 A1, furthermore, is known a motor vehicle headlamp with two main light sources arranged in a housing, in which light guides are arranged between the external lens and the housing of the motor vehicle headlamp. The ends of the light guides are routed to a back corner of the housing of the motor vehicle headlamp and are coupled there to a lamp located on a heat sink.

It is a disadvantage of motor vehicle headlamps of this type that the visibility of the light guiding elements arranged in the housing behind the external lens is restricted by the housing or the external lens itself.

In addition, WO 2013/075792 A2 discloses a lighting device for a motor vehicle that comprises a motor vehicle headlamp with two main light sources arranged in a housing that is sealed with an external lens. Arranged on the external lens is a support element that is designed to accommodate lamps.

SUMMARY OF THE INVENTION

It is therefore an object of the invention to provide a motor vehicle headlamp that allows the provision of light as well as cooling of the light provision in a compact and practical manner within the headlamp housing or alternatively as a compact, modular assembly with a simultaneous increase in the visibility of individual, selected light functions, and also to provide a motor vehicle having a corresponding motor vehicle headlamp.

According to an exemplary embodiment of the invention, a motor vehicle headlamp is made available. The motor vehicle headlamp according to the invention comprises a housing in which is arranged at least one main light source as well as at least one additional lamp. The motor vehicle headlamp also comprises a heat sink for cooling the lamp as well as an at least partially transparent external lens that seals the housing with respect to the outside environment of the motor vehicle headlamp and an inner side facing the interior of the housing and an outer side facing the outside environment. In addition, the motor vehicle headlamp comprises a front housing that is arranged in front of the outer side of the external lens. According to the invention, a light-guiding element is arranged in or on the front housing that at least partially fills the interior of the front housing or forms at least a portion of a wall of the front housing, and that is designed to guide light radiated in from the at least one lamp.

An advantage of a motor vehicle headlamp implemented in this way is the increased visibility of the light-guiding element arranged in front of the outer side of the external lens of the motor vehicle headlamp.

The light-guiding element can be implemented as an elongated light guide that at least partially fills the interior of the front housing. Preferably, the elongated light guide extends in a direction substantially orthogonal to the direction of beam of the main light source inside the front housing along the outer side of the external lens of the motor vehicle headlamp. Light guides of this nature are cost-effective and permit optically homogeneous emission of light.

A collimator optical system that is capable of focusing the light emitted by the at least one lamp can be arranged in front of the at least one lamp. The collimator optical system makes it possible to center the light emitted from the lamp on a point predetermined by the geometry of the collimator optical system. The use of such a collimator optical system, which is to say of such a collimator, significantly increases the efficiency of the lighting device.

The collimator optical system in front of the at least one lamp can be arranged at least partially inside the housing. The at least one additional lamp and the heat sink can be arranged in the housing. This offers the advantage that the lighting, the cooling for the lighting, as well as the contacting of the lamp required for the lighting, and the collimator optical system are accomplished safely and compactly inside the housing of the motor vehicle headlamp. Consequently, it is not necessary for the lamp used to radiate light into the light-guiding element to be located, cooled, or connected to a power supply outside of the housing of the motor vehicle headlamp, which makes the motor vehicle headlamp inherently more robust and sturdy.

At least one region of the wall of the front housing facing the external lens can be implemented as a lens through which the at least one additional lamp can radiate light into the front housing and behind which are arranged inside the front housing, on the interior, reflecting optics by means of which incident light is deflected into the elongated light guide. In this way, light generated inside of the housing of the motor vehicle headlamp can advantageously be coupled into the light-guiding element located or arranged in the front housing.

In an embodiment, the lens, the reflecting optics, and/or the elongated light guide are implemented as one contiguous, common component. The lens, the reflecting optics, and/or the elongated light guide can be injection-molded as a contiguous component, which is to say are produced using an injection molding process. In other words, the reflecting optics can be formed from the lens and/or the light guide is joined to the reflecting optics or is formed from the same. The reflecting optics can have an input side in the region where they are joined to the lens, while the reflecting optics can have an output side in the region where they are joined to the light guide. With an embodiment of this nature, the combination including lens, reflecting optics, and light guide can be manufactured in a quick, simple, cost-effective, and robust manner.

The reflecting optics can have an input side and an output side, wherein the input side is composed of a portion of the external lens, and the reflecting optics project into the front housing through an opening formed in a wall of the front housing, wherein at least a portion of the output side of the reflecting optics is arranged inside of the front housing and in front of a light input point of the elongated light guide. In other words, the reflecting optics can be formed from the external lens and project into the front housing through the opening. The region of the external lens where the reflecting optics are arranged or from which the reflecting optics are formed thus can represent the input side of the reflecting optics. Moreover, the external lens and the reflecting optics can be injection-molded as one contiguous component, which is to say can be manufactured by means of an injection molding process as one common, contiguous component. The opening in the front housing through which the reflecting optics project into the front housing can be sealed by means of a sealing ring. For example, the sealing ring is an O-ring. The number of components required for assembly of the motor vehicle headlamp is thereby reduced, which simplifies manufacture and assembly of the motor vehicle headlamp, and also decreases the costs for the same.

The collimator optical system can have an output surface which coincides at least partially with the input side of the reflecting optics, and the collimator optical system, the external lens, and the reflecting optics can be implemented as one common, contiguous component. In other words, at least a portion of the output surface of the collimator optical system can overlap a portion of the input side of the reflecting optics. The collimator optical system, the external lens, and the reflecting optics can be injection-molded as one contiguous component, which is to say are manufactured by means of an injection molding process as one common, contiguous component, wherein the external lens forms the output surface of the collimator optical system and the input side of the reflecting optics in the region where it is joined to the collimator optical system and the reflecting optics. As a result, the assembly effort for the motor vehicle headlamp is again significantly reduced, which in turn lowers the costs for manufacture and assembly of the same.

The external lens can have a projection extending towards the outside environment that projects into the front housing through an opening formed in a wall of the front housing. The lamp, together with the collimator optical system located in front of it, can be arranged in the projection and is capable of coupling the light into the elongated light guide. The projection can be chamber-like in design and has a cup-shaped cross-section. The projection can be arranged at an edge of the external lens and is rectangular in design. At least one wall of the projection can be parallel to an input side of the elongated light guide. The projection can be inserted into the front housing with a precise fit and/or can be joined to the front housing by means of a precision fit. The main beam direction of the lamp can correspond to the direction of propagation of the elongated light guide. The heat sink can be arranged next to the lamp inside the housing. In an embodiment, it is possible to dispense with reflecting optics, which increases the efficiency of the lighting device as a whole.

The collimator optical system can have an output surface and can be manufactured as one piece with the external lens, wherein the output surface of the collimator optical system is composed of a portion of the external lens or the output surface of the collimator optical system is arranged outside of the housing between the outer side of the external lens and a wall of the front housing. With an embodiment of this nature, the light output from the collimator optical system can be more efficient, since the output surface of the collimator optical system is either composed of a section of the external lens itself, or is located behind the external lens, which is to say is no longer located within the housing, thus reducing light loss.

In an embodiment, the external lens can form a wall of the front housing. In an embodiment of this nature, the motor vehicle headlamp is especially compact in design. The contact region, where the front housing contacts the external lens, can be sealed by means of a sealing ring. For example, the sealing ring can be an O-ring.

In an embodiment, the wall of the front housing opposite the external lens can at least be partially composed of an additional lens that has at least one structure for light input and/or one structure for light output. The light-guiding element is thus composed of a portion of a lens that has at least one structure for light input and/or one structure for light output and that forms a portion of the wall of the front housing opposite the external lens. As a result of the at least one structure for light input and/or the at least one structure for light output, the beam path of the light radiated in from the lamp is deflected or changed substantially, which is to say beyond the degree provided by the phenomenon of refraction in the material. In this way a predetermined light distribution can be achieved by simple means, which makes it possible to achieve selected light functions, for example.

The external lens can have at least one structure for light output, at least in the region of the output surface of the collimator optical system, wherein the wall of the front housing opposite the external lens is at least partially composed of another lens. In an embodiment, the light-guiding element thus forms a portion of a wall of the front housing. The output surface of the collimator optical system can have at least one structure for light output. In an embodiment, the light does not need to be deflected, but instead can be emitted directly from the wall of the front housing opposite the external lens. The efficiency of the motor vehicle headlamp is improved in this way.

The wall of the front housing opposite the external lens can be the particular wall of the front housing that separates or isolates the interior of the front housing from the outside environment of the motor vehicle headlamp.

In an embodiment, the reflecting unit can be implemented as a prism and/or as a mirror arrangement. Prisms and mirror arrangements are especially well suited for deflecting light, since this takes place more efficiently when prisms or mirror arrangements are used than, for example, when a light guide device created for this purpose is used.

In an embodiment, the at least one additional lamp and the heat sink can be arranged in or on the front housing. The lighting, the cooling for the lighting, and also the contacting of the lamp required for the lighting on the front housing thus advantageously form a compact assembly. For example, the effort for maintenance work and in the case of parts replacement is reduced as a result. Additional advantages result with regard to costs.

The at least one additional lamp and the heat sink can be arranged on a back of the front housing facing the external lens. In other words, the lamp and the heat sink extend towards the housing of the motor vehicle headlamp from the back of the front housing that is arranged in front of the external lens. The exemplary embodiment described has the advantage that the lamp and the heat sink are arranged in a protected and space-saving manner, and they are not visible from the outside. Contacting is likewise facilitated by this means, since necessary contact elements can be routed, strictly by way of example, between the housing and other surrounding parts, for example car body parts, or the contact elements can be routed into the housing. The lamp and the heat sink can also project into a shaped recess in the housing, for example.

The collimator optical system can be arranged at least partially inside of the front housing. The collimator optical system is advantageously protected and arranged in a compact manner as a result. In this way the collimator optical system can also be arranged in spatial proximity to the lamp if the latter is arranged in or on the front housing, by which means assembly of the lamp and of the heat sink in or on the front housing is also made easier.

The at least one additional lamp and/or the heat sink can extend at least partially into the front housing. This has the advantage that the components are arranged in a protected and compact manner on or in the front housing.

The front housing can extend in a hook shape over at least a portion of the external lens. In other words, the front housing extends preferably linearly, which is to say in a wing-like or fin-like manner, along at least a portion of the external lens. The front housing can have a wing-shaped geometry that includes two front housing sections oriented at an angle to one another. In such an embodiment, only an insignificant portion of the light that can be emitted by the main light source is blocked by the front housing.

The external lens can be integrally attached to the housing. Further, the external lens can be welded or fastened with adhesive to the housing. This offers special advantages with regard to costs, design flexibility, safety, and tightness of the bond.

The external lens can be positioned by means of shaped elements. For example, grooves or other shaped recesses can be provided in the housing as shaped elements in which the external lens can be positioned. The joining process and the joining result are significantly improved in this way.

The external lens can also be positioned detachably on the housing by means of the shaped elements. In this case, the external lens can be secured in its position on the housing by arranging the front housing in front of the housing. Consequently, the number of components required for assembly can be advantageously reduced. The front housing and the external lens can also be implemented as a contiguous component.

The following applies both to embodiments in which the external lens is integrally joined to the housing and to embodiments in which the external lens is held on the housing by the front housing or is implemented as one piece with the front housing.

The front housing can be joined in a nondestructively detachable manner to the housing of the motor vehicle headlamp by one or more fastening elements using a positive and/or non-positive principle of action. In other words, the motor vehicle headlamp can have fastening elements that are designed to establish a durable joint between the front housing and the housing of the motor vehicle headlamp by positive and/or non-positive engagement, which joint is nondestructively detachable as needed. The front housing can thus be attached to the housing by at least one fastening element in front of the outer side of the external lens or the housing of the motor vehicle headlamp. This has the advantage that the front housing can be installed or removed quickly and easily, and ease of maintenance is improved.

If the front housing and the external lens are implemented as a contiguous component, then this contiguous component can also be attached to the housing using an integral joining principle as described above.

The front housing can be attached to the housing of the motor vehicle headlamp in such a manner that it has a defined position and orientation relative to the housing. To this end, at least one precision fit can be provided in at least one subsection of the at least one fastening element. The advantageous result of this is a precisely defined relative position between the housing and the front housing. This offers advantages, particularly with regard to achievement of the light functions as well as the external appearance. Additional positioning elements or corresponding receiving surfaces can also be provided on the housing of the motor vehicle headlamp or on the front housing itself.

One or more fastening elements can be formed from the front housing and/or the housing of the motor vehicle headlamp, or in other words are integrated into the front housing and/or the housing to form one component (in each case). The number of components is advantageously reduced by this means so that installation and removal are additionally simplified, and costs are reduced.

In an embodiment, one or more fastening elements that have elastic shape properties can be provided. A holding force and/or restoring force for establishing a connection can thus also be applied through storage and utilization of an elastic deformation energy of the fastening element, by which means the number of individual parts is advantageously reduced. Moreover, relatively small dimensional deviations can advantageously be compensated for, and the assembly effort and the costs are reduced.

Fastening elements for producing a clip connection can be provided, having at least one clip element that is designed to engage with at least one corresponding receptacle section utilizing its elasticity of shape. This offers particular advantages with regard to flexibility of product design, materials, installation and removal effort, ease of maintenance, and costs. The at least one clip element and the at least one receptacle section can be provided, at least in subsections, with precision fits, yielding the advantages already cited above.

If the external lens of the housing of the motor vehicle headlamp is implemented as a separate component, it can be attached between the housing and the front housing by means of the clip connection. Assembly effort is advantageously reduced by this means, while ease of maintenance is improved, especially with regard to components located in the housing of the motor vehicle headlamp.

A light function can be assigned to the light-guiding element. The light function can be, for example, a daytime running light, a cornering light, a turn-signal light, which is to say a directional indicator, or alternatively another light.

The housing of the motor vehicle headlamp additionally can include the electronics required for operating the lamp and/or a plug connector for electrically connecting the lamp to a power source.

In addition, according to the invention a motor vehicle is made available that has a motor vehicle headlamp according to the invention as well as a radiator grill with at least one radiator grill fin, wherein the front housing visually forms an extension of the at least one radiator grill fin. A motor vehicle implemented in such a manner is better visible for an external observer because of the higher efficiency of the lighting device.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
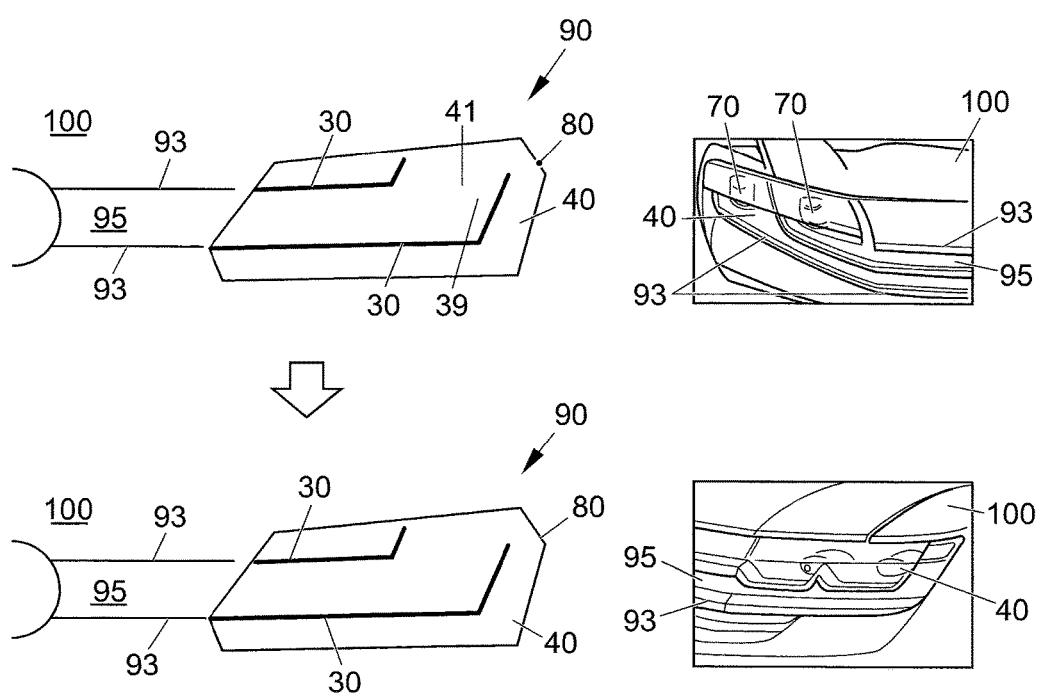
FIG. 1 illustrates front views of the radiator grill of different exemplary embodiments of motor vehicles according to the invention with an exemplary embodiment of a motor vehicle headlamp according to the invention.

FIG. 1 shows various front views of the radiator grill 95 of different exemplary embodiments of motor vehicles 100 according to the invention with an exemplary embodiment of a motor vehicle headlamp 90 according to the invention. At the top left in FIG. 1, the exemplary embodiment of the motor vehicle headlamp 90 according to the invention is shown in the switched-off state, whereas it is shown in operation at the bottom left in FIG. 1. At the top right in FIG. 1, a direct front view is shown of the exemplary embodiment of the motor vehicle headlamp 90 designed according to the invention in the installed state in a motor vehicle 100 designed in accordance with the invention, while a lateral front view of another exemplary embodiment of a motor vehicle headlamp 90 according to the invention is shown at the bottom right in FIG. 1.

The motor vehicle headlamp 90 comprises a housing 80, in which two main light sources 70 are arranged in this exemplary embodiment. Various optical components such as shields and reflectors are associated with the main light sources 70 in this exemplary embodiment strictly by way of example. However, motor vehicle headlamps 90 according to the invention can also be implemented with other components or without these optical components. The motor vehicle headlamp 90 in this exemplary embodiment comprises a completely transparent external lens 40 that seals the housing 80 with respect to the outside environment of the motor vehicle headlamp 90 and has an inner side 41 facing the interior of the housing 80 and an outer side 39 facing the outside environment. The external lens 40 can also be designed to be or made opaque in sections, which is to say non-transparent in sections. In addition, the motor vehicle headlamp 90 according to the invention in this exemplary embodiment includes, strictly by way of example, two front housings 30, which are arranged in front of the outer side 39 of the external lens 40. In this exemplary embodiment, the front housings 30 each have a hook-like design and each extend over a portion of the external lens 40. In other words, the front housings 30 in this exemplary embodiment each extend linearly, which is to say in a wing-like or fin-like manner, along a substantial portion of the external lens 40. The front housings 30 thus each have a wing-shaped geometry that in each case includes two front housing sections oriented at an angle to one another, which enclose an obtuse angle between 90° and 160° in this exemplary embodiment, strictly by way of example. However, a front housing 30 of a motor vehicle headlamp 90 designed according to the invention can also have a different shape or a different geometry, for example a trough shape, a straight line shape, but also an entirely different, arbitrary shape or geometry. A front housing 30 of a motor vehicle headlamp 90 designed according to the invention with a trough-shaped or "W"-shaped curve or with a trough-shaped or "W"-shaped geometry is shown in an exemplary embodiment at the bottom right in FIG. 1.

In this exemplary embodiment, the radiator grill 95 of the motor vehicle 100 designed according to the invention has two horizontal radiator grill fins 93, which is to say they are substantially parallel to the ground that the motor vehicle 100 stands on. The front housings 30 of the exemplary embodiment of the motor vehicle headlamp 90 according to the invention connect directly to these radiator grill fins 93, and form a visual extension of the radiator grill fins 93.

Figure 2:
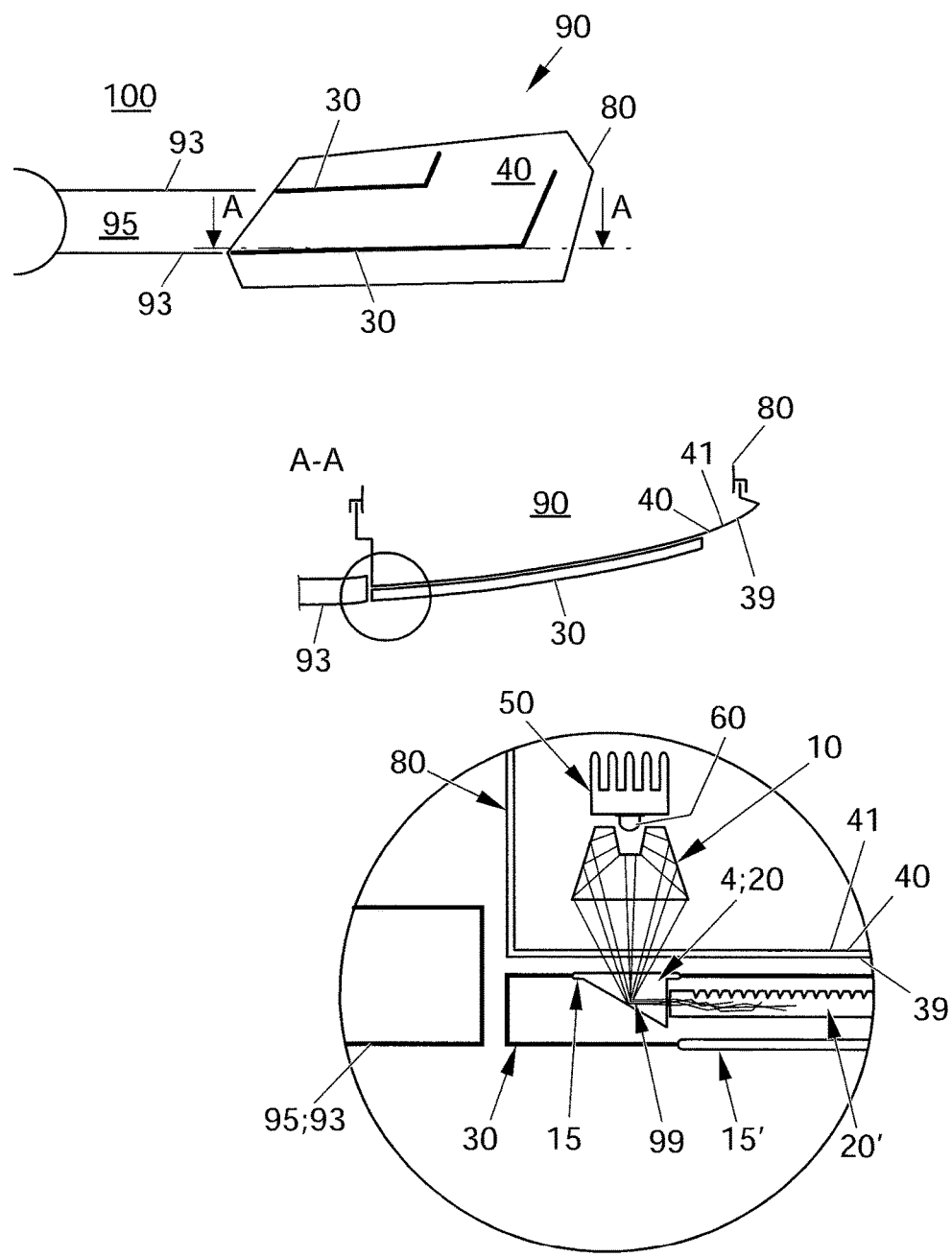
FIG. 2 illustrates schematic representations of an exemplary embodiment of a motor vehicle headlamp according to the invention in the installed state in a motor vehicle.

In FIG. 2, various schematic representations of the exemplary embodiment of a motor vehicle headlamp 90 according to the invention in the installed state in a motor vehicle 100 are shown. In other words, FIG. 2 shows the exemplary embodiment of a motor vehicle headlamp 90 according to the invention that was already shown in FIG. 1 and described above. The motor vehicle headlamp 90 is shown in cross-section at the bottom left and bottom right in FIG. 2. Identically labeled components in FIG. 2 correspond to those shown in FIG. 1, so the above description for these components also applies to the identically labeled components in FIG. 2. In the exemplary embodiment of the motor vehicle headlamp 90 according to the invention, this headlamp includes a lamp 60 arranged in the housing 80, with the lamp being arranged in an edge region inside of the housing 80 in the exemplary embodiment shown in FIG. 2. Strictly by way of example, the lamp 60 in this exemplary embodiment is a light emitting diode. However, motor vehicle headlamps 90 according to the invention can also be realized with one or more than one lamps 60 and differently implemented lamps. For example, a lamp 60 of a motor vehicle headlamp 90 according to the invention can also be a halogen lamp or an entirely different lamp 60. The motor vehicle headlamp 90 additionally includes a heat sink 50, likewise arranged in the housing 80, for cooling the lamp 60, with the lamp 60 in this exemplary embodiment being arranged on the heat sink 50 strictly by way of example.

In this exemplary embodiment, a light-guiding element 20 is arranged in the front housing 30, which element extends along the interior of the front housing 30 and fills a substantial portion of the same. The light-guiding element 20 is designed to guide light 99 radiated in from the lamp 60. In this exemplary embodiment, the light-guiding element 20 is thus implemented as an elongated light guide 20' that fills a substantial portion of the interior of the front housing 30. In other words, the light-guiding element 20 is implemented as an elongated, light-guiding bar that is matched to the shape of the front housing 30 and that is embedded in the front housing 30. In addition, in this exemplary embodiment, a collimator optical system 10 that is capable of focusing the light 99 emitted by the lamp 60 is arranged in front of the lamp 60 and within the housing 80. A region of the wall of the front housing 30 facing the outer side 39 of the external lens 40 is implemented, in this exemplary embodiment, as a transparent lens 15 through which the lamp 60 can radiate light 99 into the front housing 30 and behind which is arranged inside the front housing 30, on the interior, reflecting optics 4 by means of which incident light 99 is deflected into the elongated light guide 20'. In other words, the region of the wall of the front housing 30 facing the outer side 39 of the external lens 40 that is located at the level of the collimator optical system 10 is implemented as a transparent lens 15 so that light emerging from the collimator optics 10 is radiated into the front housing 30. Arranged directly behind the transparent lens 15 are reflecting optics 4, which, in this exemplary embodiment, are made or implemented jointly with the transparent lens 15, strictly by way of example. In other exemplary embodiments of motor vehicle headlamps 90 according to the invention, the reflecting optics 4 can also be implemented as a separate part that is detached from and arranged in front of the transparent lens 15, however. Strictly by way of example in this exemplary embodiment, the reflecting optics 4 are joined to, or jointly made with, the elongated light guide 20', and are capable of deflecting light 99 coupled into the reflecting optics 4 from the lamp 60 into the elongated light guide 20'. However, motor vehicle headlamps 90 according to the invention can also be implemented in which the reflecting optics 4 are not connected with the elongated light guide 20', and are thus arranged in front of the elongated light guide 20' as a completely separate component.

In this exemplary embodiment, a portion of the wall of the front housing 30 opposite the external lens 40 is composed of an additional transparent lens 15'. Strictly by way of example in this exemplary embodiment, it extends essentially across the region of the front housing 30 where the light-guiding element 20, which is to say the elongated light guide 20', is arranged so that the light input into the elongated light guide 20' is covered by the opaque, which is to say non-transparent, portion of the wall of the front housing 30 opposite the external lens 40. In addition, the elongated light guide 20' has a plurality of output structures by means of which light that is coupled into the elongated light guide 20' is coupled out of the motor vehicle headlamp 90 through the additional transparent lens 15'.

Figure 3:
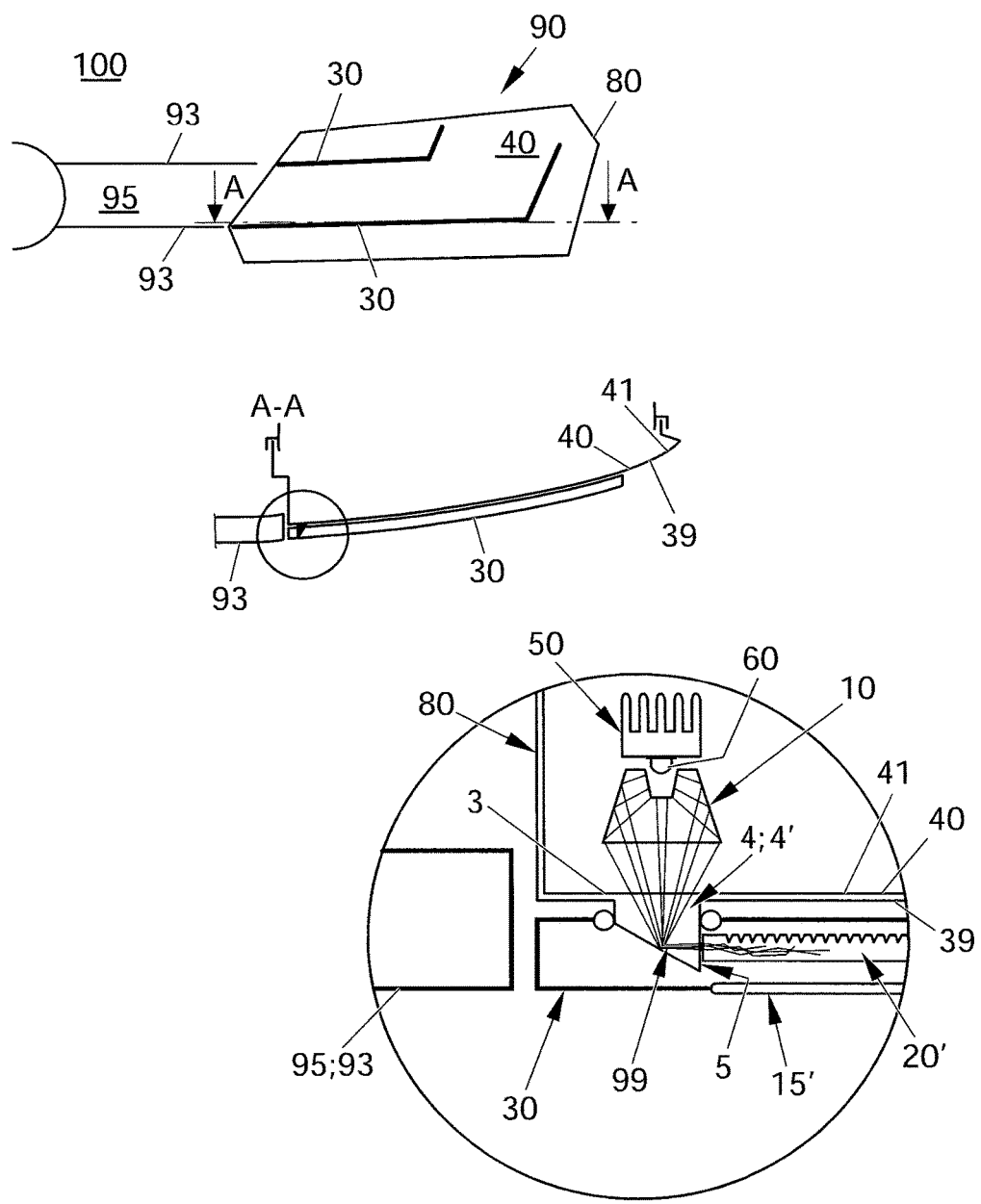
FIG. 3 illustrates schematic representations of an exemplary embodiment of a motor vehicle headlamp according to the invention in the installed state in a motor vehicle.

Shown in FIG. 3 are various schematic representations of an exemplary embodiment of a motor vehicle headlamp 90 according to the invention in the installed state in a motor vehicle 100. The exemplary embodiment shown in FIG. 3 is substantially the same as the one shown in FIG. 2. Identically labeled components in FIG. 3 correspond to those shown in FIG. 2, so the above description for these components also applies to the identically labeled components in FIG. 3. In this exemplary embodiment, the reflecting optics 4 have an input side 3 and an output side 5, wherein the input side 3 of the reflecting optics 4 is composed of a portion of the external lens 40, and the reflecting optics 4 project into the front housing 30 through an opening formed in a wall of the front housing 30. Accordingly, the output side 5 of the reflecting optics 4 is arranged completely inside of the front housing 30 and in front of a light input point of the elongated light guide 20'. In other words, the reflecting optics 4 in this exemplary embodiment are formed from the external lens 40 of the motor vehicle headlamp 90, which is to say are made together with the external lens 40. The reflecting optics 4 project through a precisely fitting opening that is provided within a wall section of the rear wall of the front housing 30 that faces the outer side 39 of the external lens 40. The opening of the front housing 30 through which the reflecting optics 4 project into the front housing 30 is sealed against the entry of dirt and moisture in this exemplary embodiment by means of an O-ring, strictly by way of example. In other words, the front housing 30 is in contact with the reflecting optics 4 in the region of the opening through the O-ring. The heat sink 50, the lamp 60, and the collimator optical system 10 are arranged inside the housing 80 of the motor vehicle headlamp 90 at an outer edge. Accordingly, the reflecting optics 4 are also positioned at an outer edge of the front housing 30, and consequently project into the front housing 30 at a lateral end of the same. The coupling of light 99 into the elongated light guide 20' can thus take place at a lateral end of the same.

Figure 4:
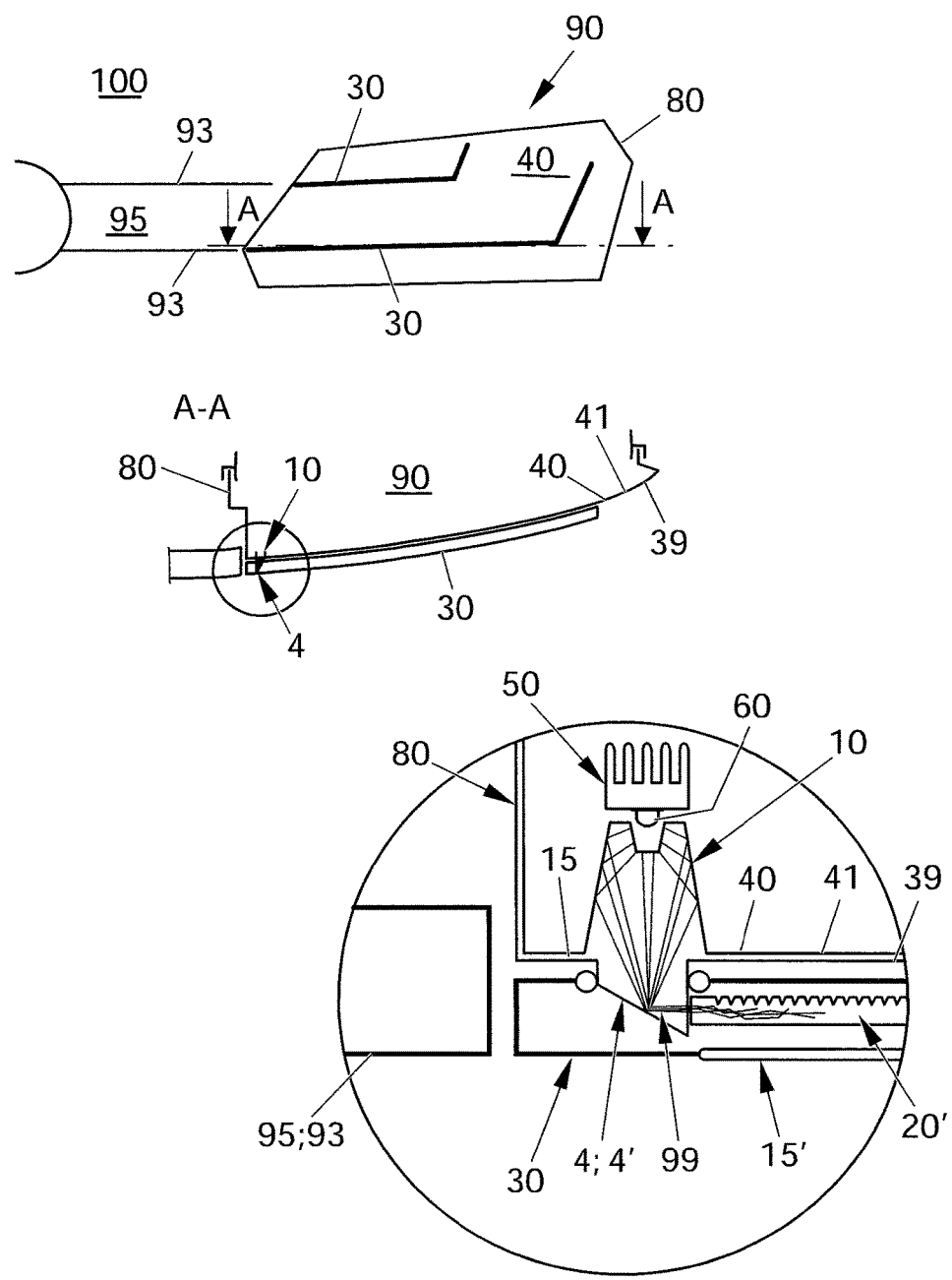
FIG. 4 illustrates schematic representations of an exemplary embodiment of a motor vehicle headlamp according to the invention in the installed state in a motor vehicle.

In FIG. 4, various schematic representations of an exemplary embodiment of a motor vehicle headlamp 90 according to the invention in the installed state in a motor vehicle 100 are shown. The exemplary embodiment shown in FIG. 4 is substantially the same as the one shown in FIG. 3. Identically labeled components in FIG. 4 correspond to those shown in FIG. 3, so the above description for these components also applies to the identically labeled components in FIG. 4. In this exemplary embodiment, the collimator optical system 10 has an output surface 11, which coincides at least partially with the input side 3 of the reflecting optics 4. Furthermore, in this exemplary embodiment the collimator optical system 10, the external lens 40, and the reflecting optics 4 are implemented as one common, contiguous component. In other words, in this exemplary embodiment, the collimator optical system 10, the external lens 40, and the reflecting optics 4 are implemented as a single component that permits direct light input inside the housing 80 as well as light output in a direction different from the light input direction outside of the housing 80 and inside of the front housing 30. In this exemplary embodiment, the opening of the front housing 30 through which the reflecting optics 4 project into the front housing 30 is sealed against the entry of dirt or moisture by means of a sealing ring, strictly by way of example. In other words, the front housing 30 is in contact with the reflecting optics 4 in the region of the opening through the sealing ring. However, motor vehicle headlamps 90 according to the invention can also be implemented in which the sealing of the opening is accomplished in a different way than with a sealing ring or an O-ring.

In the exemplary embodiments described above, the reflecting optics 4 is implemented in each case as a prism 4'. However, motor vehicle headlamps 90 according to the invention can also be implemented in which the reflecting optics 4 can be implemented differently, for example as a mirror arrangement, as a combination of a mirror arrangement and a prism 4', or else entirely differently, which is to say, for example, using completely different components.

Figure 5:
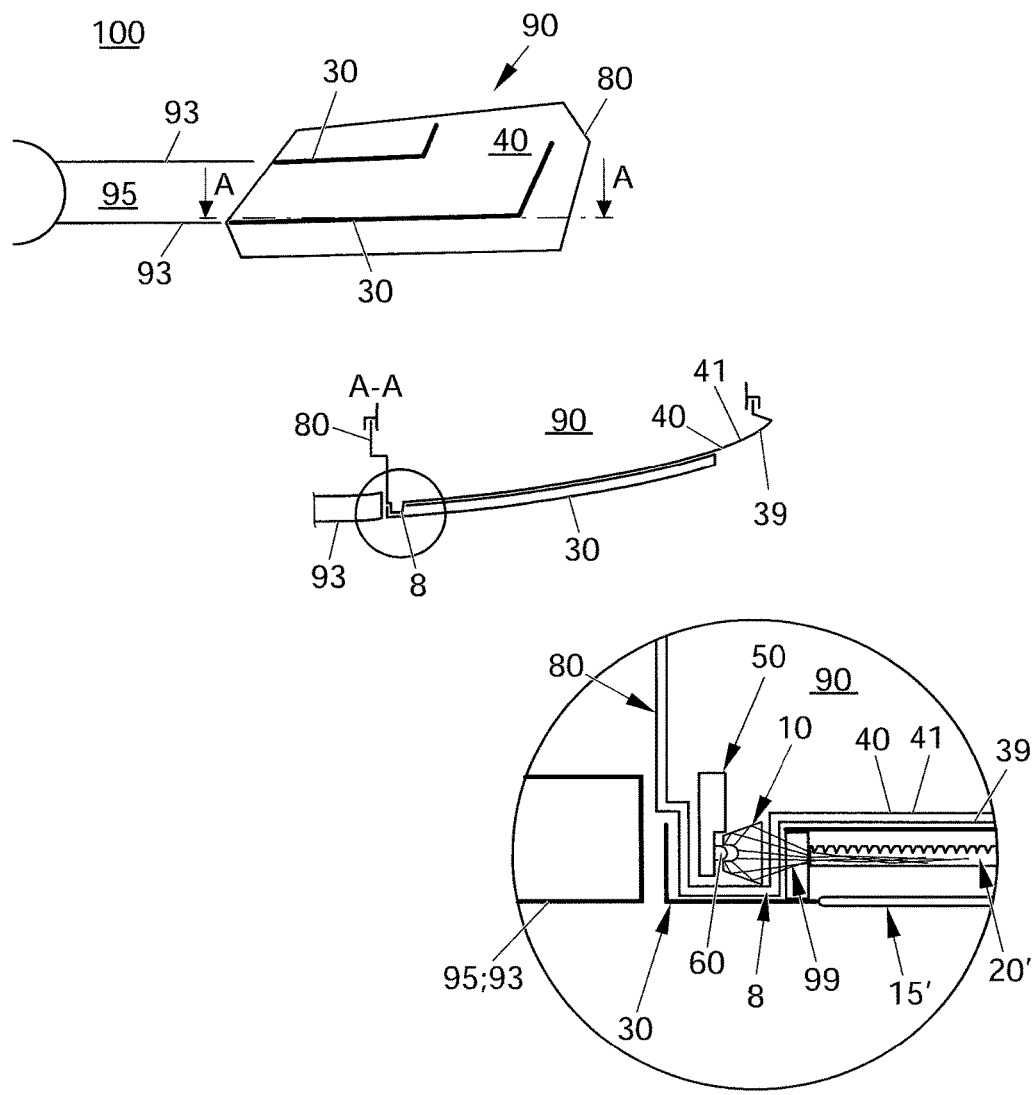
FIG. 5 illustrates schematic representations of an exemplary embodiment of a motor vehicle headlamp according to the invention in the installed state in a motor vehicle.

In FIG. 5, various schematic representations of an exemplary embodiment of a motor vehicle headlamp 90 according to the invention in the installed state in a motor vehicle 100 are shown. The exemplary embodiment shown in FIG. 5 is substantially the same as the one shown in FIG. 4. Identically labeled components in FIG. 5 correspond to those shown in FIG. 4, so the above description for these components also applies to the identically labeled components in FIG. 5. In this exemplary embodiment, the external lens 40 has a projection 8 that extends towards the outside environment of the motor vehicle headlamp 90 and that projects into the front housing 30 through an opening formed in a wall of the front housing 30, wherein the lamp 60, together with the collimator optical system 10 located in front of it, is arranged in the projection 8 and is capable of coupling light 99 into the elongated light guide 20'. In other words, the external lens 40 in this exemplary embodiment has, in an edge region, a projection 8 that has a rectangular cross-section strictly by way of example. In other words, the cross-section of the projection 8 is cup-shaped or "U"-shaped. The projection 8 formed from the external lens 40 creates a chamber that projects into an opening formed at one end of the front housing 30. In this exemplary embodiment, the lamp 60 and also the collimator optical system 10 are arranged inside of the chamber-like projection 8. The lamp 60 and the collimator optical system 10 are rotated by 90° here as compared to the previously described exemplary embodiments, so the direction of beam of the lamp 60 coincides with the elongated direction of propagation or orientation of the elongated light guide 20'. For this reason, reflecting optics 4 can be eliminated in a motor vehicle headlamp 90 in this exemplary embodiment. The light 99 generated by means of the lamp 60 is coupled directly into the elongated light guide 20' through the collimator optical system 10.

Figure 6:
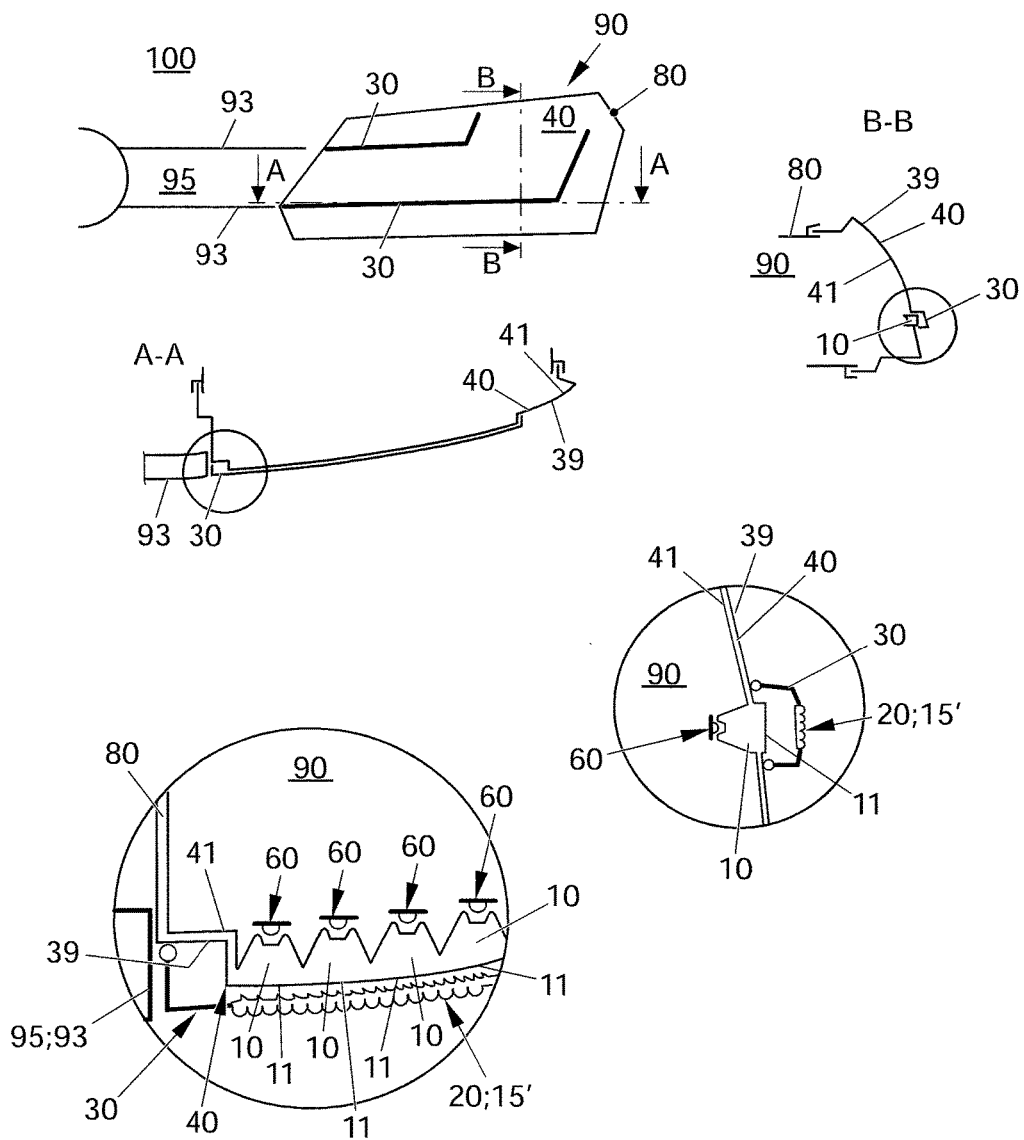
FIG. 6 illustrates schematic representations of an exemplary embodiment of a motor vehicle headlamp according to the invention in the installed state in a motor vehicle.

In FIG. 6, various schematic representations of an exemplary embodiment of a motor vehicle headlamp 90 according to the invention in the installed state in a motor vehicle 100 are shown. The exemplary embodiment shown in FIG. 6 is substantially the same as the one shown in FIG. 5. Identically labeled components in FIG. 6 correspond to those shown in FIG. 5, so the above description for these components also applies to the identically labeled components in FIG. 6. In this exemplary embodiment, a plurality of lamps 60 and a plurality of collimator optical systems 10 are provided, wherein the plurality of lamps 60, together with each of the associated collimator optical systems 10, are arranged inside the housing 80 along the front housings 30 in front of the inner side 41 of the external lens 40. In this design one collimator optical system 10 is associated with each lamp 60. The collimator optical systems 10 each have an output surface 11 and are manufactured as one piece with the external lens 40, wherein the output surfaces 11 of the collimator optical systems 10 are composed in each case of a portion of the external lens 40. In this exemplary embodiment the external lens 40 itself forms one wall of the front housing 30. In other words, the front housing 30 in this exemplary embodiment is semi-enclosed in design and is placed on the outer side 39 of the external lens 40 and joined thereto. Described in still different terms, the front housing 30 in this exemplary embodiment has the shape of a rail with a "U"-shaped cross-section, and its open side is placed on the outer side 39 of the external lens 40 and joined thereto. Arranged in the contact region or in the joint region between the front housing 30 and the external lens 40 is a seal that seals the combination of front housing 30 and external lens 40 against the entry of dirt and moisture into the front housing 30. The region of the outer side 39 of the external lens 40 enclosed by the front housing 30 is composed substantially of the row of output surfaces 11 of the collimator optical systems 10 arranged next to one another in a row. The wall section of the front housing 30 opposite the output surfaces 11 of the external lens 40 is composed in this exemplary embodiment of an additional lens 15', which has a plurality of structures for light input and for light output in this exemplary embodiment.

The light 99 emitted by the lamps 60 is therefore first coupled into the collimator optical systems 10, whence it is coupled out into the front housing 30. The light 99 coupled into the front housing 30 is in turn coupled into the additional lens 15' through the structures for light input and coupled out through its structures for light output into the outside environment of the motor vehicle 100. Motor vehicle headlamps 90 according to the invention can also be implemented in which the output surfaces 40 of the collimator optical systems 10 are arranged outside of the housing 80, between the outer side 39 of the external lens 40 and the wall of the front housing 30 having the additional lens 15', and thus pass through the external lens 40. In such an exemplary embodiment as well, the collimator optical systems 10 are made together with the external lens 40. The light-guiding element 20 is composed of the additional lens 15' in this exemplary embodiment. A very specific light distribution is achieved by the combination of the structures for light input with the structures for light output to the additional lens 15'.

Figure 7:
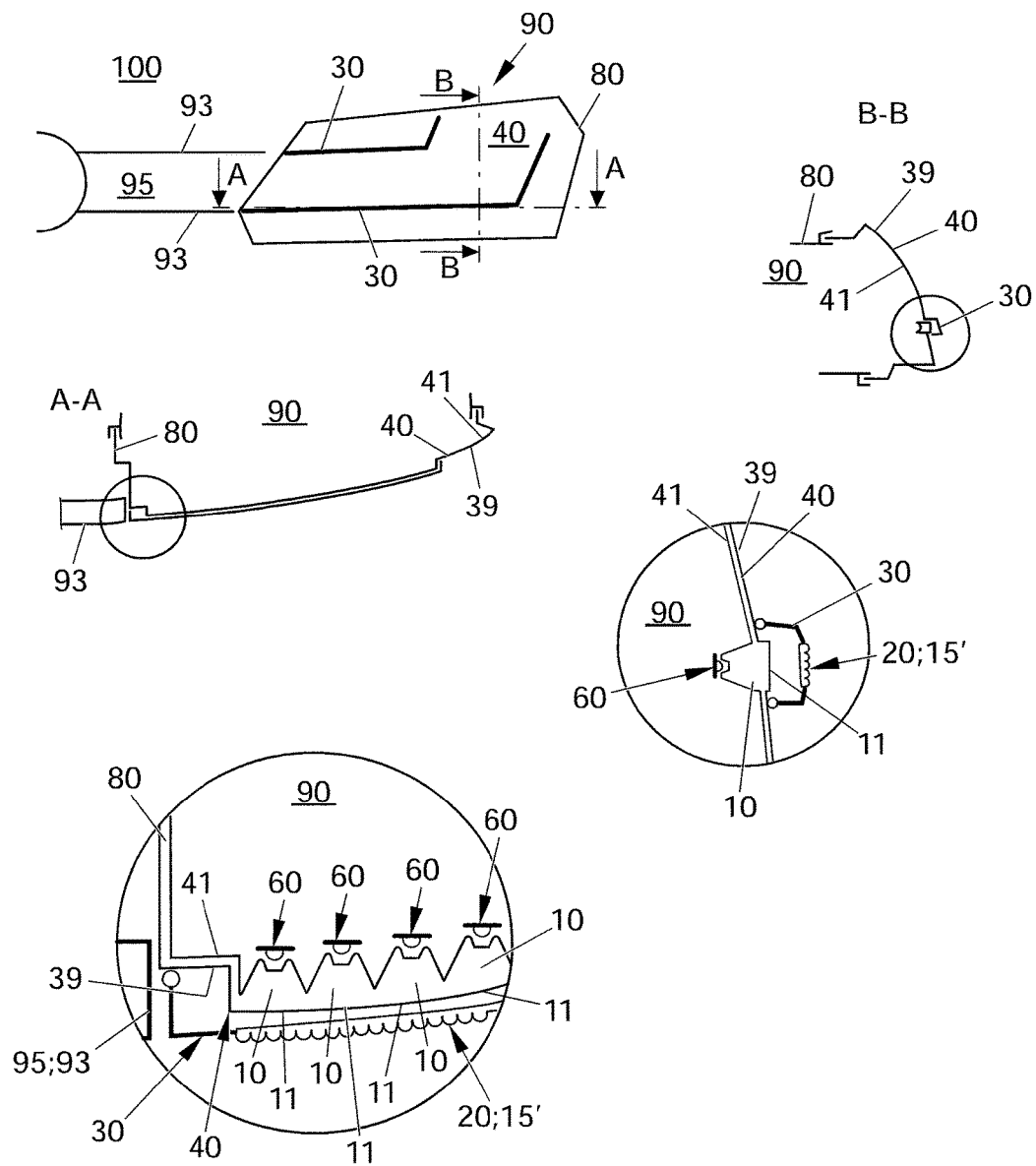
FIG. 7 illustrates schematic representations of an exemplary embodiment of a motor vehicle headlamp according to the invention in the installed state in a motor vehicle.

In FIG. 7, various schematic representations of an exemplary embodiment of a motor vehicle headlamp 90 according to the invention in the installed state in a motor vehicle 100 are shown. The exemplary embodiment shown in FIG. 7 is substantially the same as the one shown in FIG. 6. Identically labeled components in FIG. 7 correspond to those shown in FIG. 6, so the above description for these components also applies to the identically labeled components in FIG. 7. In contrast to the exemplary embodiment shown in FIG. 6, the additional lens 15' in the exemplary embodiment shown in FIG. 7 has no structures for light input, instead only having structures for light output. In this sixth embodiment, by means of the motor vehicle headlamp 90 according to the invention, yet another distinct light pattern can be emitted that differs from the light patterns that can be produced by the exemplary embodiments described above.

Figure 8:
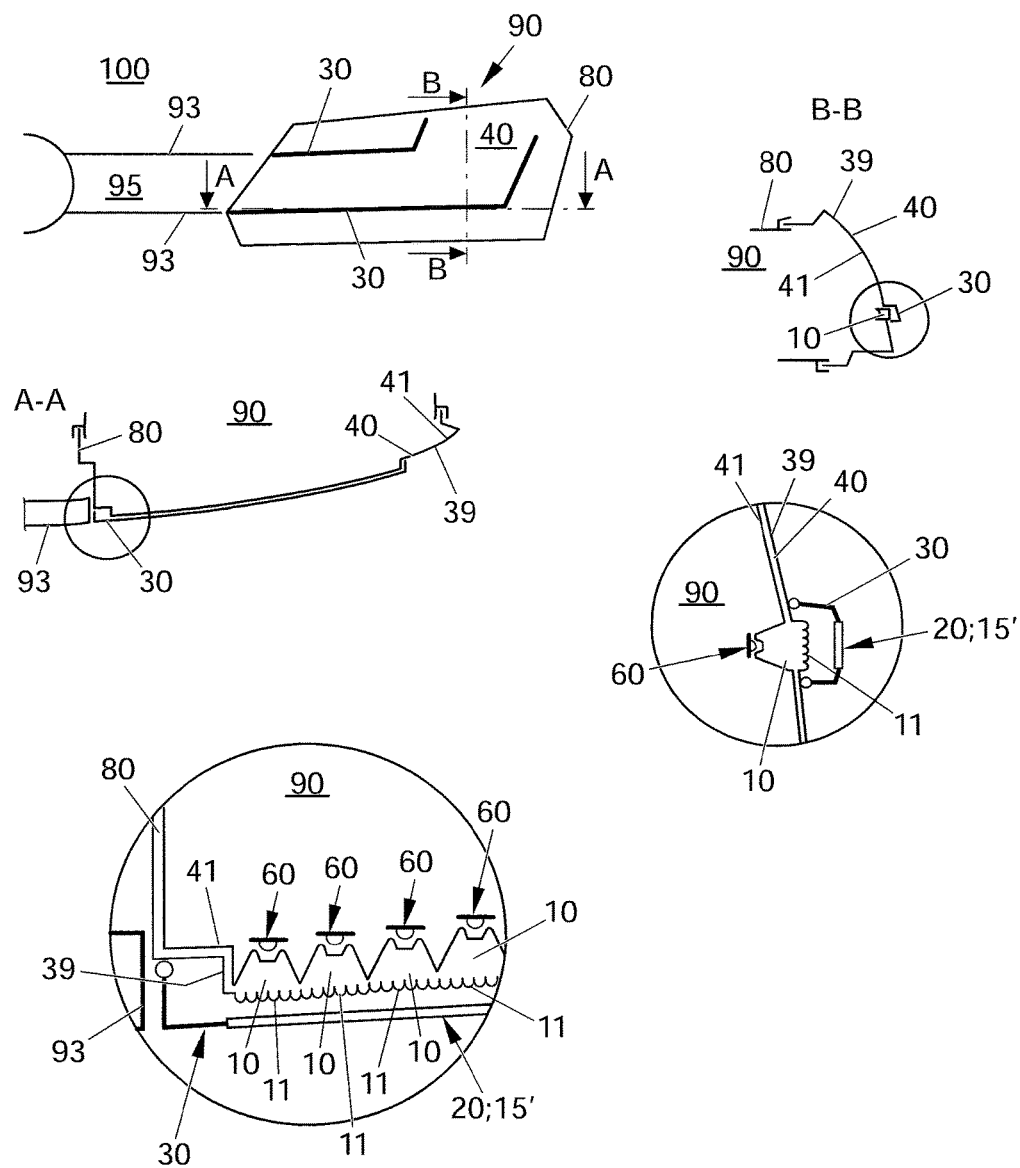
FIG. 8 illustrates schematic representations of an exemplary embodiment of a motor vehicle headlamp according to the invention in the installed state in a motor vehicle.

In FIG. 8, various schematic representations of an exemplary embodiment of a motor vehicle headlamp 90 according to the invention in the installed state in a motor vehicle 100 are shown. The exemplary embodiment shown in FIG. 8 is substantially the same as the one shown in FIG. 7. Identically labeled components in FIG. 8 correspond to those shown in FIG. 7, so the above description for these components also applies to the identically labeled components in FIG. 8. The exemplary embodiment shown in FIG. 8, in contrast to the exemplary embodiment shown in FIG. 7, has an additional lens 15' entirely without any structures for light input or light output. In the exemplary embodiment shown in FIG. 8, in contrast, the output surfaces 11 of the collimator optical systems 10 have structures for light output that characteristically shape the light pattern that can be emitted by means of the motor vehicle headlamp 90 according to the invention. For example, the light 99 guided through the collimator optical systems can be fanned out by means of the structures for light output provided on the output surfaces 11.

Figure 9:
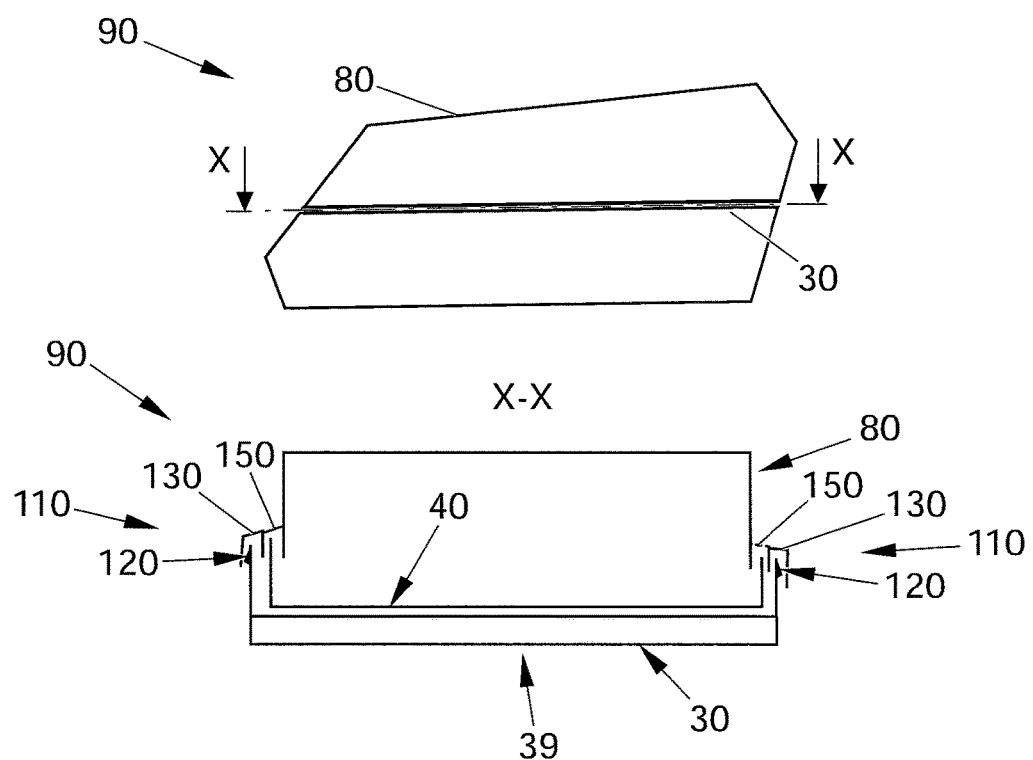
FIG. 9 illustrates a schematic representation of an exemplary embodiment of a motor vehicle headlamp according to the invention with a clip connection.

Shown in FIG. 9 is a schematic representation of an exemplary embodiment of a motor vehicle headlamp 90 according to the invention with a clip connection 110.

Identically labeled components in FIG. 9 correspond to those shown in FIG. 1, so the above description for these components also applies to the identically labeled components in FIG. 9. The depiction in the top part of FIG. 9 is based in simplified form on the exemplary embodiment of the motor vehicle headlamp 90 according to the invention shown at the top left in FIG. 1. FIG. 9 shows the front housing 30, which is joined to the housing 80 of the motor vehicle headlamp 90 by means of the clip connection 110. The front housing 30 is attached in front of the outer side of the external lens 39 of the motor vehicle headlamp 90 to the housing 80 through multiple clip elements 120 with elasticity of shape. The clip elements 120 engage with corresponding receptacle sections 130 of the housing 80. The external lens 40 is positioned and oriented relative to the housing 80 through shaped elements 150, embodied as grooves, and is fastened with adhesive to the housing.

Figure 10:
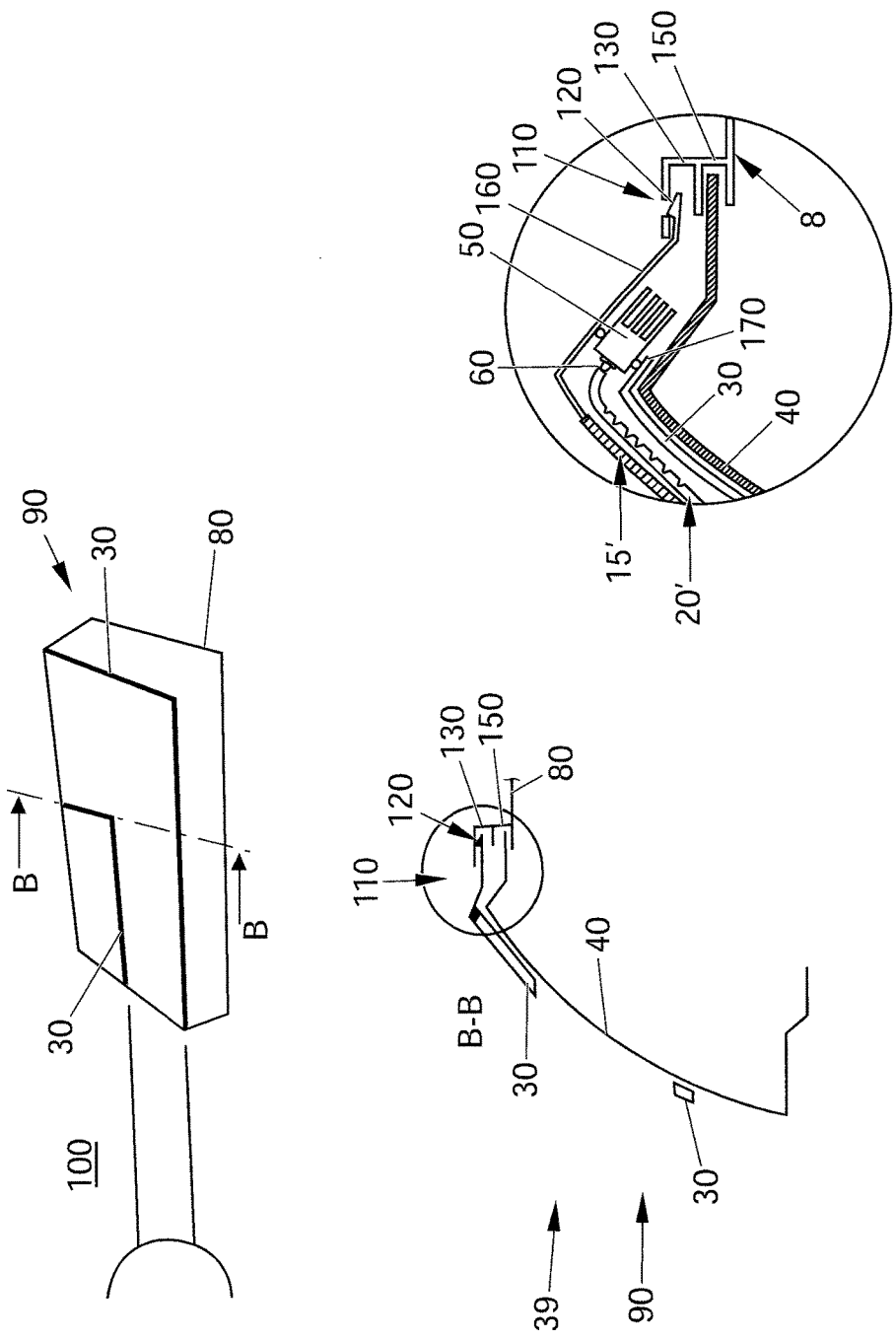
FIG. 10 illustrates a schematic representation of an exemplary embodiment of a motor vehicle headlamp according to the invention with lamp and heat sink arranged on the front housing.

Shown in FIG. 10 is a schematic representation of an exemplary embodiment of a motor vehicle headlamp 90 according to the invention with lamp 60 and heat sink 50 arranged on the front housing 30. Identically labeled components in FIG. 10 correspond to those shown in FIG. 1, so the above description for these components also applies to the identically labeled components in FIG. 10. The depiction in the top part of FIG. 10 is based on the exemplary embodiment of the motor vehicle headlamp 90 according to the invention shown at the top left in FIG. 1. In the bottom left-hand part of FIG. 10, the motor vehicle headlamp 90 according to the invention is shown in a cross-sectional representation, in which the front housing 30, the external lens 40, and in this embodiment the clip connection 110 with receptacle sections 130 and clip elements 120—here shown only on one side by way of example—as well as the shaped elements 150 and the housing 80 are visible in partial representation. The clip connection 110 and the arrangement of the at least one additional lamp 60 and the heat sink 50 are shown in greater detail in a detail enlargement in the bottom right part. It is clearly visible that the lamp 60 and heat sink 50 are arranged on the front housing 30 or attached in such a manner that the components project partially into the front housing 30. An outer wall 160 terminating in the clip connection 110 only partially encloses the lamp 60 and the heat sink 50 so that they are opposite the external lens 40 toward the inside. In other preferred embodiments the wall can be absent, however, and instead an inner wall 170 can transition into the clip connection 110 so that the at least one lamp 60 and the heat sink 50 are facing the environment. In additional embodiments, the lamp 60 and the heat sink 50 can also be fully enclosed in the front housing 30, strictly by way of example through appropriate design of the walls 160, 170 around the components. The elongated light guide 20' connects to the lamp 60. The lamp 60 here is designed to radiate light 99 into the elongated light guide 20'. The front housing 30 has an additional lens 15' through which the light 99 can be emitted into the environment.

Figure 11:
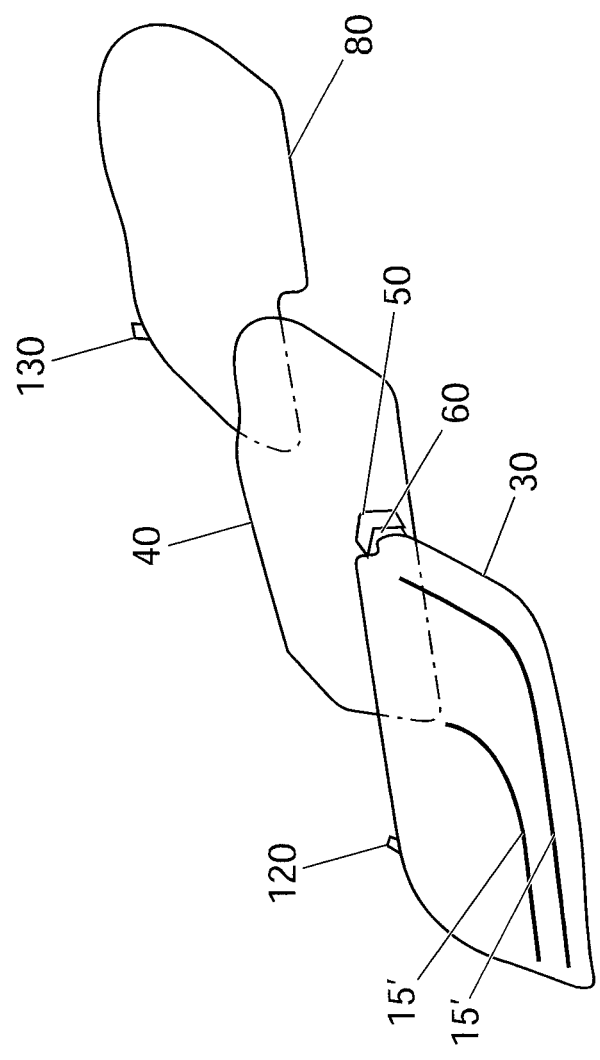
FIG. 11 illustrates a schematic representation, in an exploded view, of an exemplary embodiment of a motor vehicle headlamp according to the invention with lamp and heat sink arranged on the front housing.

In FIG. 11, a schematic representation of an exemplary embodiment of a motor vehicle headlamp 90 according to the invention with lamp 60 and heat sink 50 arranged on the front housing 30 is shown in an exploded view. Identically labeled components in FIG. 11 correspond to those shown in FIG. 1, so the above description for these components also applies to the identically labeled components in FIG. 11. In FIG. 11 the front housing 30, the external lens 40, and the housing 80 are sketched spatially offset. The clip connection is indicated here only by an exemplary clip element 120 on the front housing 30 and by an exemplary receptacle section 130 for the clip element 120. The clip connection can be formed of a plurality of clip elements 120 and receptacle sections 130. It is clearly visible that the at least one additional lamp 60 is arranged outside on the front housing. Arranged on the lamp 60 is the heat sink 50. In this exemplary embodiment, yet one more additional lamp 60 and a heat sink 50 are provided, which are not shown in detail here and are arranged partially in the front housing 30 or are obscured by it. The front housing 30 in this exemplary embodiment has two additional lenses 15', behind each of which is arranged an elongated light guide 20' that is not shown in detail here. Each of the lamps 60 with heat sink 50 supplies light 99 to one elongated light guide 20' apiece.

Figure 12:
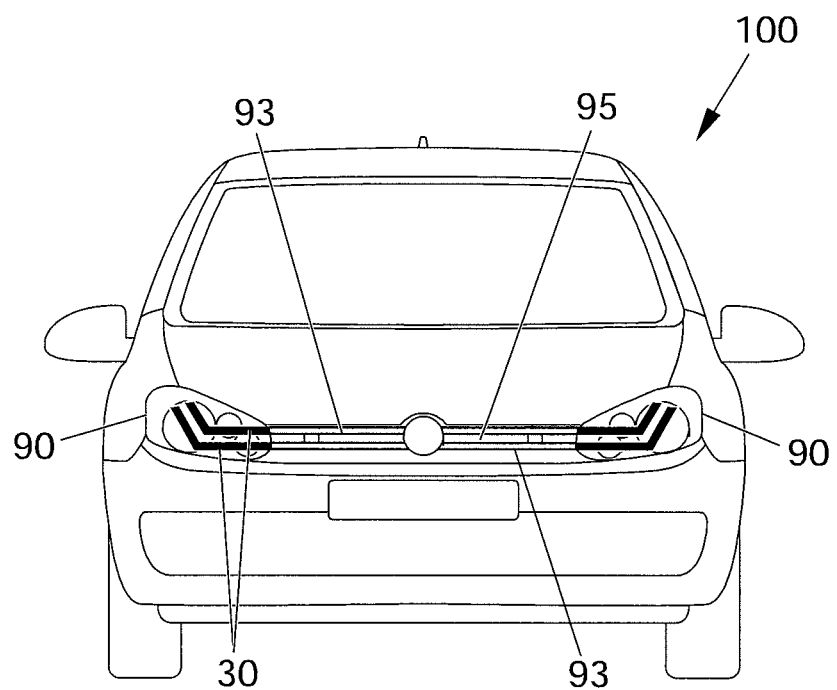
FIG. 12 illustrates a front view of an exemplary embodiment of a motor vehicle according to the invention with motor vehicle headlamps designed according to the invention.

Shown in FIG. 12 is a front view of an exemplary embodiment of a motor vehicle 100 according to the invention with motor vehicle headlamps 90 designed according to the invention. The motor vehicle headlamps 90 designed according to the invention in this exemplary embodiment of the motor vehicle 100 are, strictly by way of example, the two front headlamps 90 of the motor vehicle 100, which are implemented in accordance with the exemplary embodiment described above. The motor vehicle 100 additionally has at its front end a radiator grill 95 that comprises two radiator grill fins 93 arranged one above the other, which extend from front headlamp 90 to front headlamp 90. In this exemplary embodiment of the motor vehicle 100, the front housings 30 of the motor vehicle headlamps 90 form an extension of the radiator grill fins 93. However, motor vehicles 100 according to the invention can also be realized with motor vehicle headlamps 90 according to the invention in which they are the taillights of the motor vehicle 100 or other motor vehicle headlamps 90.

In the exemplary embodiments described above, a daytime running light function is assigned in each case to the light-guiding elements 20 arranged in the front housings 30. However, motor vehicles 100 according to the invention can also be realized with motor vehicle headlamps 90 according to the invention in which the function assigned in each case to the light-guiding elements 20 arranged in the front housings 30 is a turn-signal light function, a cornering light function, a low beam function, a high beam function, a fog light function, a rear fog light function, a back-up light function, a side marker light function, a navigation light function, a taillight function, a parking light function, and/or another light function.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A motor vehicle headlamp comprising:
a housing;
at least one main light source arranged in the housing;
at least one additional lamp;
a heat sink for cooling the at least one additional lamp;
an at least partially transparent external lens that seals the housing from an outside environment of the motor vehicle headlamp, the external lens having an inner side facing an interior of the housing and an outer side facing the outside environment;
a front housing arranged in front of the outer side of the external lens; and
a light-guiding element arranged in or on the front housing, the light-guiding element at least partially filling the interior of the front housing or forms at least a portion of a wall of the front housing, the light-guiding element being adapted to guide light radiated from the at least one additional lamp,
wherein the light-guiding element is an elongated light guide, and
wherein at least one region of the wall of the front housing facing the external lens is configured as a lens through which the at least one additional lamp radiates light into the front housing and behind which are arranged inside the front housing, on the interior, reflecting optics via which incident light is deflected into the elongated light guide.

2. The motor vehicle headlamp according to claim 1, wherein a collimator optical system that is adapted to focus the light emitted by the at least one additional lamp is arranged in front of the at least one additional lamp.

3. The motor vehicle headlamp according to claim 2, wherein the collimator optical system is arranged at least partially inside the housing.

4. The motor vehicle headlamp according to claim 1, wherein the at least one additional lamp and the heat sink are arranged in the housing.

5. The motor vehicle headlamp according to claim 1, wherein the lens, the reflecting optics, and/or the elongated light guide are one contiguous, common component.

6. The motor vehicle headlamp according to claim 1, wherein the reflecting optics is a prism or a mirror arrangement.

7. The motor vehicle headlamp according to claim 1, wherein the external lens is integrally joined to the housing.

8. The motor vehicle headlamp according to claim 1, wherein the front housing is joined to the housing of the motor vehicle headlamp in a nondestructively detachable manner by one or more fastening elements.

9. The motor vehicle headlamp according to claim 8, wherein the front housing is joined to the housing of the motor vehicle headlamp via a clip connection.

10. A motor vehicle headlamp comprising:
a housing;
at least one main light source arranged in the housing;
at least one additional lamp;
a heat sink for cooling the at least one additional lamp;
an at least partially transparent external lens that seals the housing from an outside environment of the motor vehicle headlamp, the external lens having an inner side facing an interior of the housing and an outer side facing the outside environment;
a front housing arranged in front of the outer side of the external lens; and
a light-guiding element arranged in or on the front housing, the light-guiding element at least partially filling the interior of the front housing or forms at least a portion of a wall of the front housing, the light-guiding element being adapted to guide light radiated from the at least one additional lamp,
wherein the light-guiding element is an elongated light guide,
wherein the headlamp further comprises reflecting optics arranged in front of the at least one additional lamp,
wherein the reflecting optics have an input side and an output side,
wherein the input side comprises a portion of the external lens, and the reflecting optics project into the front housing through an opening formed in the wall of the front housing, and
wherein at least a portion of the output side of the reflecting optics is arranged inside of the front housing and in front of a light input point of the elongated light guide.

11. The motor vehicle headlamp according to claim 10, wherein a collimator optical system that is adapted to focus the light emitted by the at least one additional lamp is arranged in front of the at least one additional lamp and behind the reflecting optics, wherein the collimator optical system has an output surface that coincides at least partially with the input side of the reflecting optics, and wherein the collimator optical system, the external lens and the reflecting optics are one common, contiguous component.

12. A motor vehicle headlamp comprising:
a housing;
at least one main light source arranged in the housing;
at least one additional lamp;
a heat sink for cooling the at least one additional lamp;
an at least partially transparent external lens that seals the housing from an outside environment of the motor vehicle headlamp, the external lens having an inner side facing an interior of the housing and an outer side facing the outside environment;
a front housing arranged in front of the outer side of the external lens; and
a light-guiding element arranged in or on the front housing, the light-guiding element at least partially filling the interior of the front housing or forms at least a portion of a wall of the front housing, the light-guiding element being adapted to guide light radiated from the at least one additional lamp,
wherein the light-guiding element is an elongated light guide,
wherein the external lens has a projection extending towards the outside environment that projects into the front housing through an opening formed in the wall of the front housing, and
wherein the at least one additional lamp together with a collimator optical system located in front of the at least one additional lamp, are arranged in the projection and couple light into the elongated light guide.

13. The motor vehicle headlamp according to claim 12, wherein the at least one additional lamp and the heat sink are arranged in or on the front housing.

14. The motor vehicle headlamp according to claim 13, wherein the at least one additional lamp and/or the heat sink extend at least partially into the front housing.

15. The motor vehicle headlamp according to claim 13, wherein the at least one additional lamp and the heat sink are arranged on a back of the front housing that faces the external lens.

16. The motor vehicle headlamp according to claim 12, wherein the collimator optical system is arranged at least partially inside of the front housing.

17. The motor vehicle headlamp according to claim 12, wherein the front housing extends in a hook shape over at least a portion of the external lens.

18. A motor vehicle headlamp comprising:
a housing;
at least one main light source arranged in the housing;
at least one additional lamp;
a heat sink for cooling the at least one additional lamp;
an at least partially transparent external lens that seals the housing from an outside environment of the motor vehicle headlamp, the external lens having an inner side facing an interior of the housing and an outer side facing the outside environment;
a front housing arranged in front of the outer side of the external lens; and
a light-guiding element arranged in or on the front housing, the light-guiding element at least partially filling the interior of the front housing or forms at least a portion of a wall of the front housing, the light-guiding element being adapted to guide light radiated from the at least one additional lamp,
wherein the light-guiding element is an elongated light guide,
wherein a collimator optical system has an output surface and is formed as one piece with the external lens, and
wherein the output surface of the collimator optical system comprises a portion of the external lens or the output surface of the collimator optical system is arranged outside of the housing between the outer side of the external lens and a wall of the front housing.

19. The motor vehicle headlamp according to claim 18, wherein the external lens forms a wall of the front housing.

20. The motor vehicle headlamp according to claim 19, wherein the wall of the front housing opposite the external lens is at least partially composed of another lens that has at least one structure for light input and/or one structure for light output.

21. The motor vehicle headlamp according to claim 19, wherein the external lens has at least one structure for light output, at least in a region of the output surface of the collimator optical system, and wherein the wall of the front housing opposite the external lens is at least partially composed of an additional lens.

22. A motor vehicle comprising:
a motor vehicle headlamp; and
a radiator grill with at least one radiator grill fin,
wherein the motor vehicle headlamp includes:
a housing;
at least one main light source arranged in the housing;
at least one additional lamp;
a heat sink for cooling the at least one additional lamp;
an at least partially transparent external lens that seals the housing from an outside environment of the motor vehicle headlamp, the external lens having an inner side facing an interior of the housing and an outer side facing the outside environment;
a front housing arranged in front of the outer side of the external lens; and
a light-guiding element arranged in or on the front housing, the light-guiding element at least partially filling the interior of the front housing or forms at least a portion of a wall of the front housing, the light-guiding element being adapted to guide light radiated from the at least one additional lamp, and
wherein the front housing visually forms an extension of the at least one radiator grill fin.

23. A motor vehicle headlamp comprising:
a housing;
at least one main light source arranged in the housing;
at least one additional lamp;
a heat sink for cooling the at least one additional lamp;
an at least partially transparent external lens that seals the housing from an outside environment of the motor vehicle headlamp, the external lens having an inner side facing an interior of the housing and an outer side facing the outside environment;
a front housing arranged in front of the outer side of the external lens, the front housing having an inner side facing the outer side of the external lens and an outer side facing the environment; and
a light-guiding element arranged in front of the outer side of the front housing, the light-guiding element having an inner side facing the outer side of the front housing and an outer side facing the environment, the light-guiding element being adapted to guide light radiated from the at least one additional lamp, and
an additional lens arranged in front of the outer side of the light-guiding element, the additional lens having an outer wall extending therefrom, a distal end of the outer wall having a clip,
wherein the housing includes a receptacle that engages with the clip of the outer wall of the additional lens to form a clip connection, and
wherein the housing includes a groove that receives a distal end of the external lens.

* * * * *